July 15, 1969 T. H. BURGESS 3,456,141
COOLING MEANS FOR MULTIPLE ROTOR AC MOTOR
Filed Aug. 1, 1967
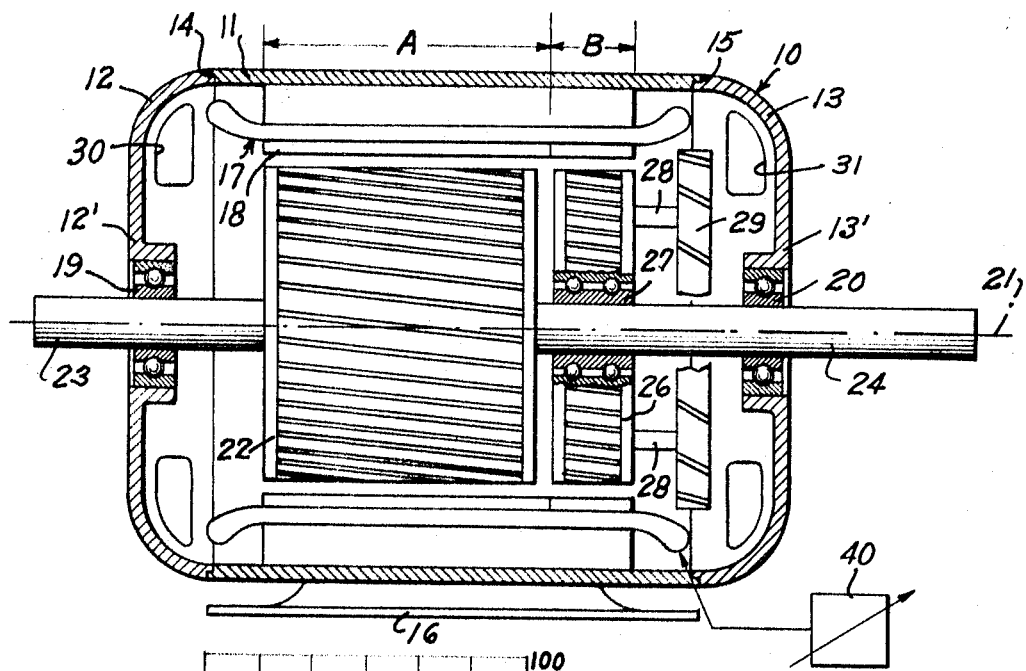
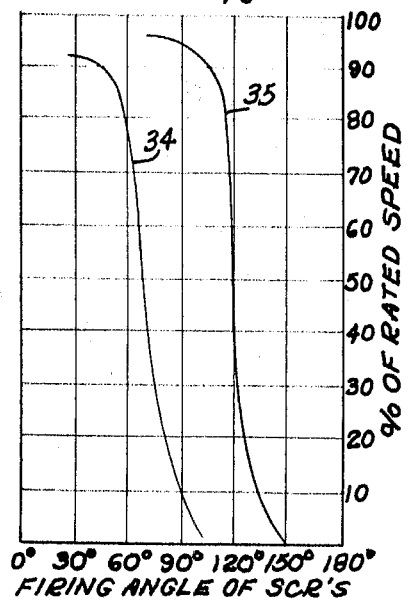
INVENTOR.
Thomas H. Burgess
BY Hill, Sherman, Meroni, Gross & Simpson ATTORNEYS

United States Patent Office 3,456,141
Patented July 15, 1969

---

3,456,141
COOLING MEANS FOR MULTIPLE ROTOR AC MOTOR
Thomas H. Burgess, 3100 Polk St.,
Little Rock, Ark. 72207
Filed Aug. 1, 1967, Ser. No. 657,547
Int. Cl. H02k 21/10, 23/60, 9/00
U.S. Cl. 310—114          5 Claims

ABSTRACT OF THE DISCLOSURE

An AC motor having a housing for containing a stator and a pair of rotors. The stator may include two pole piece portions displaced axially from one another so that one pole piece portion is adjacent a first rotor and the other pole piece portion is adjacent a second rotor. The first rotor, which is the main rotor includes a pair of stub shafts which extend therefrom and through bearing means formed in opposite end walls of the housing. The second rotor is provided with a bearing and journalled on one of the stub shafts. The second rotor is adapted to carry a cooling fan which, in turn, provides adequate ventilation of the motor. Therefore, the main rotor can be operated at reduced speeds while the second rotor, carrying the cooling fan, rotates at a fixed speed thereby maintaining the motor at a desired operating temperature.

BACKGROUND OF THE INVENTION

Field of the invention

This invention relates generally to dynamoelectric machines and more particularly to motors which are to be operated from a source of alternating current voltage. Specifically, the present invention is directed to an improved motor construction which includes a single stator positioned within the motor housing and a pair of rotors also positioned within the motor housing to be affected by the stator.

Description of the prior art

Heretofore, typical AC motors have been designed to run at a single specific speed depending upon the requirement or use of the motor. The motor is designed using selective materials so as to prevent overheating during normal operation. However, should a motor so designed be operated at a reduced speed, at a speed lesser than it was originally designed to operate, the motor will invariably overheat. By changing the material selected, the construction of the motor the overheating problem can be somewhat compensated for but not totally eliminated. Furthermore, such materials are usually more expensive which results in a cost factor undesirable to the user.

Accordingly, AC motors which are designed to operate at a single speed will overheat when connected to a variable speed control which, in turn, allows the AC motor to be operated at lesser speeds. For example, an AC motor designed to operate at 3600 r.p.m. can be connected to a speed control circuit expressly designed for AC motors thereby greatly increasing the versatility of the motor. However, it is found that in so connecting a motor to a speed control circuit the motor tends to overheat when operated at speeds, for example, of less than 1000 r.p.m. Therefore, a cooling fan, which is usually secured to the rotor within the motor, does not move a sufficient amount of air to provide proper cooling of the motor.

One solution to the problem of overheating is to wind a second stator within the same housing and provide a second rotor arranged to support a cooling fan. That is, a second motor is formed within the same housing. However, the second motor is energized through a separate set of wire conductors so as to run at a fixed speed regardless of the speed of the main motor. This method complicates the operation of connecting the motor to an electrical circuit as well as increases the cost of the motor.

SUMMARY OF THE INVENTION

Accordingly, it is an object of this invention to provide an AC motor which can be connected to a speed control circuit and operated at reduced speeds without overheating.

Another object of the present invention is to provide an AC motor which can be constructed of conventional materials without regard of the speed at which the motor is to be operated at by the user.

Yet another object of the present invention is to provide an AC motor which is compact, efficient and inexpensive.

A feature of the present invention is the use of a second rotor positioned within the motor housing and journalled about one stub shaft extending from the main rotor and rotatable relative to the stub shaft. The second rotor carries a fan to provide adequate cooling circulation through the motor.

Briefly, a motor constructed in accordance with the principles of this invention provides a stator which is extended in the axial direction of the motor further than is normally required to energize the main rotor. A second rotor is journalled for rotation on the stub shaft of the main rotor to be effected by the extended portion of the stator. As the second rotor carries only a cooling fan, it requires only a small amount of torque to accelerate the second rotor and the fan to its maximum r.p.m. Accordingly, the extended portion of the stator is sufficient to induce the low starting torque required. The speed of rotation of the second rotor will be near synchronous speeds with ample torque to drive the fan.

When an AC motor is connected to a speed control circuit, as for example, a speed control circuit of the type having a plurality of silicon controlled rectifiers to control the firing angle of an alternating current voltage applied to the motor, the characteristic of the motor is that a greater on time of the silicon controlled rectifiers is required to operate the motor at low speed than is required to operate the motor at high speed. Therefore, with no feedback signal from a tach-generator or the like, a motor would at some critical firing angle of the silicon controlled rectifier accelerate from 0 to full speed with no intermediate speeds obtainable.

On the other hand, when a motor consrtucted in accordance with the principles of this invention is connected to such a speed control, the firing angle is controlled by the feedback of the tachometer connected to the main rotor, and the firing angle must exceed the critical angle to start the main rotor. The fan rotor will start at this time, but its very low loading at low speeds, plus its lower inertia, will allow the second rotor to accelerate to a speed higher than that of the main rotor by the time the tachometer feedback has started to reduce the firing angle of the silicon controlled rectifiers supplying current to the stator. Thus, even though the firing angle is reduced, it is still sufficient to maintain the fan rotor rotating at full speed.

An additional feature of a motor constructed in accordance with the principles of this invention is that a multipole motor may be provided with, for example, 4, 6 or 8 pole piece portions adjacent the main rotor to cause rotation thereof. A pair of pole pieces may extend from the stator to a point adjacent the second rotor causing the second rotor to rotate at maximum speed. This feature will cause the maximum speed of the main rotor to be the correct speed for the number of poles for which it is wound, and the fan motor to operate as a two pole motor, thus allowing the second rotor and fan to rotate at a much higher speed.

BRIEF DESCRIPTION OF THE DRAWINGS

Accordingly, other objects, features and advantages will be more fully realized and understood from the following detailed description when taken in conjunction with the accompanying drawings wherein:

FIGURE 1 is an elevational sectional view of a motor constructed in accordance with the principles of this invention; and FIGURE 2 is a graph to explain the motor characteristics of a motor constructed in accordance with this invention.

DESCRIPTION OF THE PREFERRED EMBODIMENT

Seen in FIGURE 1 is an AC motor constructed in with the principles of this invention connected to speed control circuit 40. The motor is provided with a housing 10 which is formed of a center cylindrical portion 11 and a pair of end caps 12 and 13. The end caps 12 and 13 form opposite end walls 12' and 13' of the housing 10. The motor housing is of conventional design having undercuts 14 and 15 formed in the cylindrical portion 11 and the end caps 12 and 13 to provide easy assembly and alignment of the end caps onto the center portion 11. The housing 10 may be provided with a base 16 to facilitate mounting of the motor in a desired location.

Secured to the interior surface of the housing 10 is a stator 17 which forms a plurality of pole pieces 18. The pole pieces 18 extend circumferentially around the interior of the housing 10 in a conventional manner. However, in accordance with this invention, the pole pieces extend axially within the housing 10 a distance further than is necessary to effect rotation of a rotor. For example, the stator 17 is divided into two portions. A first pole piece portion A is provided to influence the rotation of a main rotor while a second pole piece portion B extends from the pole piece portion A to influence the rotation of a second rotor within the housing. For example, the first pole piece portion A may comprise a plurality of poles, as for example, 4, 6, 8, etc., while the second pole piece portion B may contain only two poles which are formed by extending a selected pair of the poles from the pole piece portion A. However, it will be understood that the pole piece portions A and B may contain the same number of poles.

Secured to the opposite end walls 12' and 13' is a pair of bearings 19 and 20 respectively. The bearings 19 and 20 are in axial alignment with one another along the axes 21 passing through the motor housing 10. The bearings 19 and 20 although shown as ball bearings, may be of any desirable configuration such as bronze bushings.

A main rotor 22 is positioned within the housing 10 and adjacent the pole piece portion A to be influenced thereby. The main rotor 22 includes a first end shaft 23 which extends from the rotor 22 and is journalled by the bearing 19. Also, the rotor 22 is provided with a second end shaft 24 which extends from the rotor 22 and is journalled by the bearing 20.

A unique feature of the present invention is the provision of a second rotor 26 which is journalled for rotation about the end shaft 24. The second rotor 26 is positioned adjacent the pole piece portion B so as to be influenced by the magnetic field produced thereby. The second rotor 26 may be held in position on the shaft 24 by suitable means such as snap rings fitted within grooves formed around the shaft 24 on opposite sides of the rotor. A bearing 27 is positioned within the second rotor 26 and allows the rotor 26 to rotate freely about the shaft 24.

A plurality of bosses 28 are formed on the second rotor 26 radially outwardly of the end shaft 24 and extend therefrom along an axis parallel to the axis 21 passing through the motor 10. A cooling fan 29 is secured to the bosses 28. Therefore, rotation of the second rotor 26 will cause the fan 29 to circulate cooling air through the motor housing 10. For example, cooling air may enter the apertures 30, formed in the end cap 12, and pass through the motor housing between the stator and the rotors and exit a plurality of apertures 31 which are formed in the end cap 13. The fan may also be formed by die casting it from aluminum or similar material integrally with the shorting bar on the end of the rotor.

Accordingly, a motor constructed in accordance with the principles of this invention can be operated at a lesser speed than it was initially designed to be operated as the second rotor will continue to rotate at or near the synchronous speed to provide sufficient cooling of the motor.

Seen in FIGURE 2 is a graph illustrating the typical motor charatceristic of an AC motor. The curvilinear line 34 represents the characteristic of the main rotor while the curvilinear 35 represents the characteristic of the second rotor 26. For an understanding of the operation of an AC motor constructed in accordance with the principles of this invention, let us assume that the pole piece portions A and B have the same number of poles. Energization of the stator by silicon controlled rectifiers which are rendered conductive during the 0° firing angle will cause both the main rotor 22 and the second rotor 26 to start up and reach their maximum speeds in a short period of time. However, as the firing angle is increased, as for example to a 60° firing angle the main rotor will decrease in speed to approximately 75% of the rated speed while the second rotor 26 will continue to rotate at its maximum speed. Similarly should the firing angle be increased to 90°, the main rotor will decrease to 10% of its rated speed while the second rotor 26 will continue to rotate at its maximum speed.

Now let us assume that the speed control is set at some intermediate speed during the initial start up of the motor. In a double rotor motor as constructed according to this invention, the firing angle is controlled by the feedback from a tachometer connected to the main rotor as is well known in the art. The firing angle must exceed the critical firing angle to start the main rotor rotating. The fan rotor will start to rotate but due to its very low loading at low speeds plus its low inertia the second rotor will accelerate to its maximum speed by the time the main rotor has reached a speed sufficient to cause the tachometer feedback to decrease the firing angle of the silicon controlled rectifiers. Therefore, even though the firing angle is reduced, it is still greater than is necessary to maintain the fan rotor rotating at its higher speed while the main rotor will rotate at a lesser speed.

The operation as described above is substantially the same for motors having a different number of pole pieces within the pole piece portion A than are formed within the pole piece portion B, the only difference being that the synchronous speeds of the two rotors would be different and proportional to the number of poles formed within the pole piece portions.

Accordingly, other variations and modifications may be effected without departing from the spirit and scope of the novel concepts of this invention.

I claim as my invention:

1. A dynamoelectric machine comprising:
   a housing having opposite end walls;
   bearing means in each of said end walls and in axial alignment with one another;
   a stator secured to the interior of said housing;
   a first rotor having first and second end shafts extending therefrom toward said end walls to be embraced by said bearing means, said first rotor being positioned in said housing to be influenced by a magnetic field generated by said stator, the improvement therein comprising:

a second rotor journalled for rotation on said first end shaft and positioned within said housing to be influenced by said magnetic field, and the provision of said stator as first and second pole piece portions, said first pole piece portion positioned adjacent said first rotor to influence the speed of rotation of said first rotor, and said second pole piece portion positioned adjacent said second rotor to influence the speed of rotation of said second rotor, whereby said second rotor is arranged to rotate at a speed different than said first rotor.

2. A dynamoelectric machine according to claim 1 wherein said second rotor further includes boss means secured thereto and positioned radially outwardly of said first shaft and extending away from said first rotor, and a fan secured to said boss means and contained within said housing, whereby said second rotor and said fan will rotate at a fixed speed to provide proper cooling of the dynamoelectric machine when said first rotor is operated at a reduced speed.

3. A dynamoelectric machine according to claim 1 wherein said first pole piece portion has a different number of poles than said second pole piece portion.

4. A dynamoelectric machine according to claim 3 wherein said first pole piece portion has a greater number of poles than said second pole piece portion.

5. An AC motor comprising:
a single stator having stator windings for establishing an electrical field and a pair of stator pole pieces, two separate rotors each coupled to a respective one of said rotor pole pieces;
means mounting said rotors for rotation independently of one another but in common within said electrical field of said stator;
means for selectively changing the speed of one of said rotors; and
air translation means drivingly connected to the other of said rotors for directing a flow of air through said motor for cooling.

References Cited

UNITED STATES PATENTS 2,922,098  1/1960  Hutson _____ 310—125

FOREIGN PATENTS 913,054  12/1962  Great Britain.
1,257,701  2/1961  France.

WARREN E. RAY, Primary Examiner

R. SKUDY, Assistant Examiner

U.S. Cl. X.R.

310—58, 258